(12) United States Patent
Ahuja et al.

(10) Patent No.: US 10,509,690 B2
(45) Date of Patent: *Dec. 17, 2019

(54) EXPOSING SERVER FUNCTIONS TO BROWSER CODE

(71) Applicant: MICROSOFT TECHNOLOGY LICENSING, LLC, Redmond, WA (US)

(72) Inventors: Vikas Ahuja, Sammamish, WA (US); Brian Charles Blomquist, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/954,306

(22) Filed: Apr. 16, 2018

(65) Prior Publication Data

US 2018/0239653 A1 Aug. 23, 2018

Related U.S. Application Data

(63) Continuation of application No. 12/971,934, filed on Dec. 17, 2010, now Pat. No. 9,946,581.

(51) Int. Cl.
*G06F 9/54* (2006.01)
(52) U.S. Cl.
CPC .................... *G06F 9/54* (2013.01)
(58) Field of Classification Search
CPC ....... H04L 67/02; H04L 63/168; H04L 63/02; H04L 41/046; H04L 63/029; H04L 63/0428; H04L 63/1466; H04L 63/1483; H04L 69/329; H04L 41/00; H04L 51/12; H04L 63/0281; H04L 63/1433; H04L 29/06; H04L 29/12066; H04L 29/12594; H04L 41/28; H04L 51/04; H04L 61/1511; H04L 63/0209; H04L 63/0435; H04L 63/0442; H04L 63/061; H04L 63/067; H04L 63/08; H04L 63/0838; H04L 63/101; H04L 63/1416; H04L 63/1441; H04L 63/145; H04L 67/125; H04L 67/22
See application file for complete search history.

(56) References Cited

U.S. PATENT DOCUMENTS 6,862,732 B1 * 3/2005 Schultz ................. G06F 9/542
714/E11.179
7,150,004 B2 * 12/2006 Russell ................. G06F 9/4493
717/118

(Continued)

*Primary Examiner* — Djenane M Bayard
(74) *Attorney, Agent, or Firm* — Workman Nydegger (57) ABSTRACT

The exposing of a server function to a browser. From the browser's perspective, the browser submits a request for a web page to a web server, the web page being one of multiple web pages in a web application offered by the web server. The web server responds to the request by, for at least one of the server functions, formulating a corresponding script language function that defines a matching name and parameter set of the server side function. The script language function has a body that, when executed, serializes at least the name and parameter set of the server side function. The web server then provides the web page code and the corresponding script language function to the browser. The browser may then calls the server side function via the script language function.

19 Claims, 4 Drawing Sheets

(56) References Cited

U.S. PATENT DOCUMENTS

| | | | |
|---|---|---|---|
| 9,805,006 B1* | 10/2017 | Kuhn | G06F 17/30902 |
| 2002/0120787 A1* | 8/2002 | Shapiro | G06F 9/5055 |
| | | | 719/311 |
| 2005/0204148 A1* | 9/2005 | Mayo | H04L 63/0815 |
| | | | 713/185 |
| 2008/0082965 A1* | 4/2008 | Atkin | G06F 9/454 |
| | | | 717/118 |

* cited by examiner

EXPOSING SERVER FUNCTIONS TO BROWSER CODE

CROSS REFERENCE TO RELATED APPLICATIONS

This application is a Continuation of U.S. patent application Ser. No. 12/971,934, entitled "EXPOSING SERVER FUNCTIONS TO BROWSER CODE", which was filed on Dec. 17, 2010, which will issue as U.S. Pat. No. 9,946,581 on Apr. 17, 2018, and which is incorporated by reference in its entirety herein.

BACKGROUND

In a typical web navigation experience, a user interacts with a browser on the user's computer (i.e., the client) thereby causing the browser to navigate to various web sites. The process of navigating to a web site begins by the browser formulating a request for a web page offered by a web site. The client that hosts the browser then dispatches the request to a server that hosts the web site. In response to the request, the server formulates web page code. For instance, HyperText Markup Language code (often abbreviated as "HTML" code) is often used as such web page code. The server then dispatches the web page code to the client. Upon receiving the web page code, the browser at the client interprets the web page code, and renders the web page accordingly.

In order to add a deeper level of functionality to the web page, script language code is often added into the web page code. Examples of script languages include JAVASCRIPT and VISUAL BASIC. Many browser-based applications use script language to exchange data with web servers. Conventionally, a server side function may be exposed to browser-based scripting code. In one example of an existing mechanism for exposing the server side function to scripting language code (referred to in the art as the ASP.NET Page Method), the developer exposes a web service, REST or similar API and explicitly writes code to format the data exchanged.

BRIEF SUMMARY

At least one embodiment described herein relates to the exposing of a server function to a browser. From the browser's perspective, the browser submits a request for a web page to a web server, the web page being one of multiple web pages in a web application offered by the web server. The web server responds to the request by, for at least one of the server functions, formulating a corresponding script language function that defines a matching name and parameter set of the server side function. The script language function has a body that, when executed, serializes at least the name and parameter set of the server side function. To improve security, the body may also serialize a single-click hack protection token. The web server then responds to the web page request with web page code and the corresponding script language function.

In one embodiment, the browser further executes the script language function, and provides parameter set to the executing script language function, thereby causing the name and parameter set of the server side function to be serialized in the form of a request to call the server side function. To improve security, the protection token may also be serialized in the request. In that case, the web server would receive the request to call the server side function, validate the protection token if used, formulate a parameter list, and execute the server side function using the parameter list. If there are results of the execution to return to the browser, the web server may then return such results to the browser.

In one embodiment, the script language function may be called by the browser across multiple, and potentially even all, of the web pages of the web application. Thus, the server function is exposed to the browser in a manner that the server side function may be called from multiple different contexts within the web application. Furthermore, if a protection token is used, upon validation of the protection token, the web server may have stronger assurances that any subsequent call using the script language function is truly from the browser in response to execution of the script language function.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a server side function is exposed to a browser. From the browser's perspective, the browser submits a request for a web page to a web server, the web page being one of multiple web pages in a web application offered by the web server. The web server responds to the request by, for at least one of the server functions, formulating a corresponding script language function that defines a matching name and parameter set of the server side function. The script language function has a body that, when executed, serializes at least the name and parameter set of the server side function. The web server then provides the web page code and the corresponding script language function to the browser. The browser may then calls the server side function via the script language function.

First, some introductory discussion regarding computing systems will be described with respect to FIG. 1. Then, the embodiments of the exposing the server side function will be described with respect to FIGS. 2 through 4.

Figure 1:
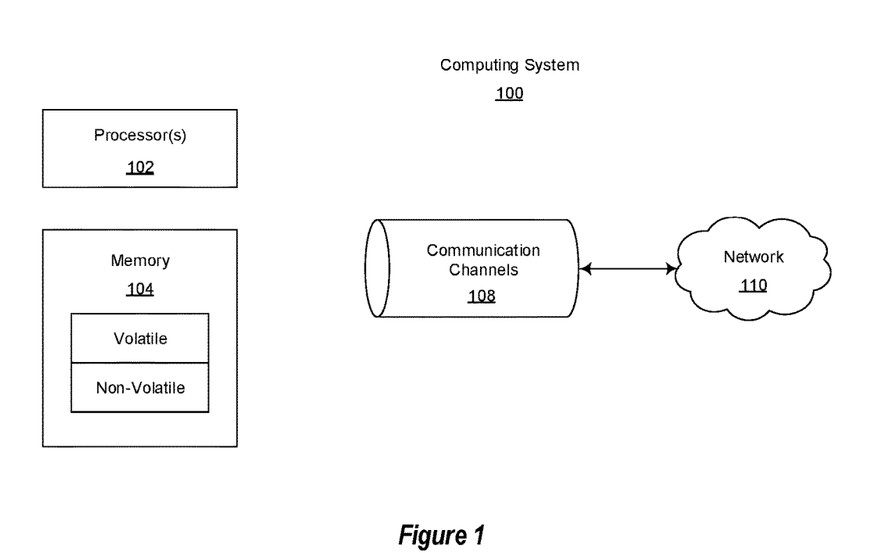
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
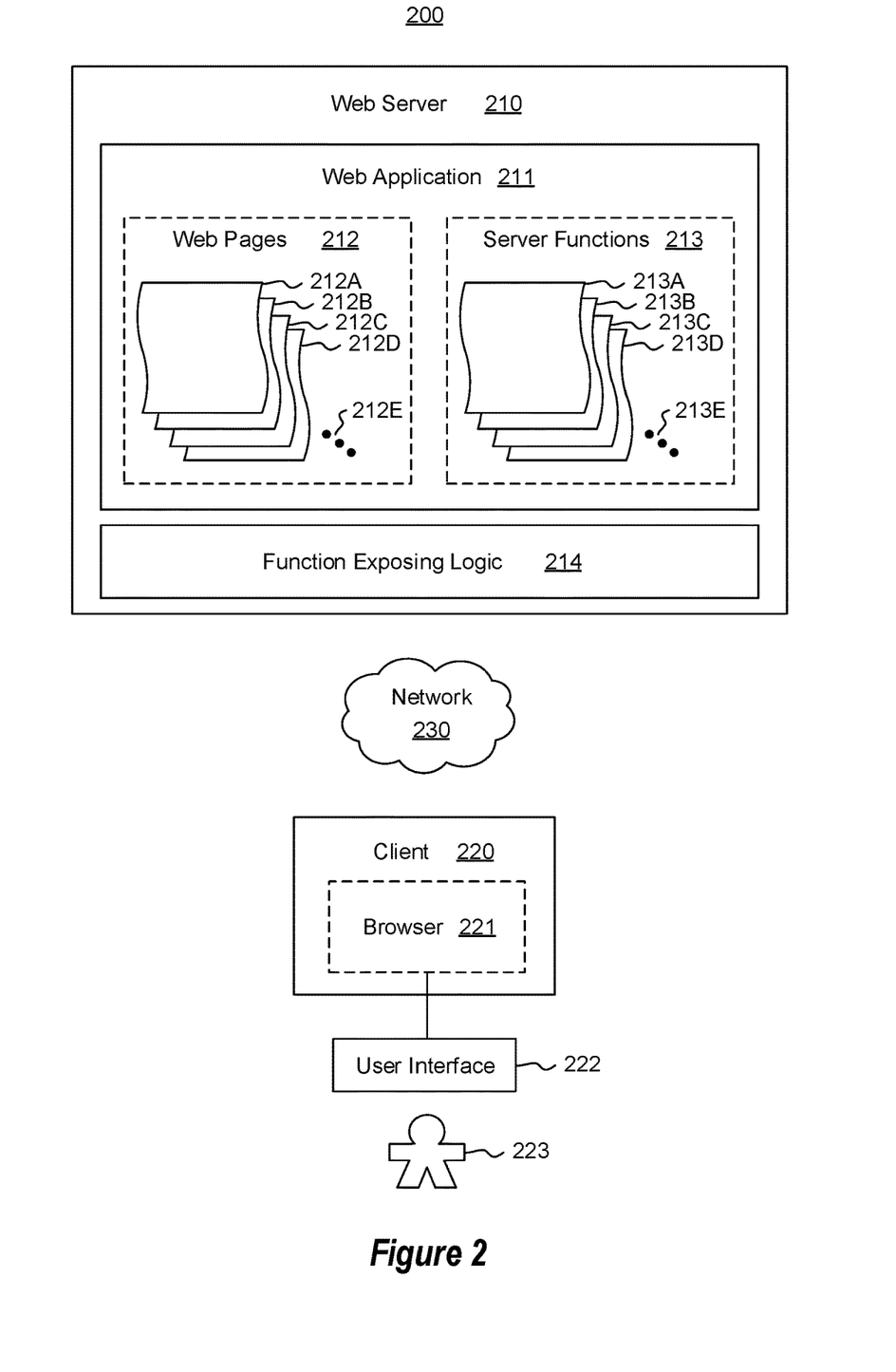
FIG. 2 illustrates a network environment in which the principles described herein may operate including a client computing system with a browser that interacts with a web application on a web server.

FIG. 2 illustrates a network environment 200 that includes a server computing system 210 and a client computing system 220. Each of the computing systems 210 and 220 may be structured as described above for the computing system 100 of FIG. 1. However, the web server 210 may also be in distributed form and perhaps operate as a cloud in a cloud computing context. The client computing system 220 and the server computing system 210 communicate over a network 230. An example of the network 230 is the Internet, a local area network, or any other network, or any combination of such networks.

The server computing system 210 is a web server that hosts a web application 211 that includes multiple web pages 212 and multiple server functions 213. The web application 211 may include any number of web pages 212. However, for example purposes only, the web pages 212 are illustrated as including four web pages 212A, 212B, 212C and 212D. However, the ellipses 212E represents general flexibility in the number of web pages that may be hosted by the web application, ranging anywhere from as few as one to being as many as limitless. Likewise, for example purposes only, the server functions 213 are illustrated as including four server functions 213A, 213B, 213C and 213D. However, the ellipses 213E represents general flexibility in the number of server functions that may be available within the web application, ranging anywhere from as few as one to being as many as limitless.

Each server function may be operable within the web application within a given scope. For instance, some of the server functions may operate from anywhere within the web application. Suppose, for example, that all of the server functions 213 are to be exposed to the browser 221. In one embodiment, once so exposed, any of the server functions 213 would then be callable from any page 212 of the web application 211. This contrasts with the above-mentioned conventional approach for exposing server functions (referred to as the ASP.NET Page Method) in which the exposed server function is only made available to the actual page in which the server function is defined. Therefore, in the conventional approach, if the server function is to be used in multiple pages, the server function would be redefined in each of such multiple pages. The embodiment in which the exposed server function is callable from any page in the web application even though defined in a single web page thus improves the flexibility and efficiency of the web application design considerably.

In alternative embodiments server functions may be more restricted in scope but still be callable from multiple web pages. For instance, perhaps server function 213A is callable from all web pages 212, but server function 213B is callable from only web pages 212A and 212B, and server function 213C is callable from only web pages 212C and 212D. Some server functions may be very restricted in scope, perhaps only be callable from a single web page. For instance, perhaps server function 213D is callable from only web page 212D. Thus, the principles described herein are not restricted exclusively to embodiments in which all server functions are made available to all web pages, though those embodiments certainly are helpful compared to conventional methods of exposing server functions.

The web server 210 also includes function exposing logic 214, which operates to expose one or more or perhaps even all of the server functions 213 to the client browser 221 of the client computing system 220 so that the server functions 213 may be invoked by the browser 221. More regarding the operation of the functional exposing logic 214 will be described below with respect to FIG. 3.

The client computing system 220 may be any computing system that can host a browser 221 and provide a user interface 222 through which a user 223 may view web pages rendered by the browser 221 and provide appropriate input. The principles described herein are not restricted to the actual physical form of the client computing system 220.

Figure 3:
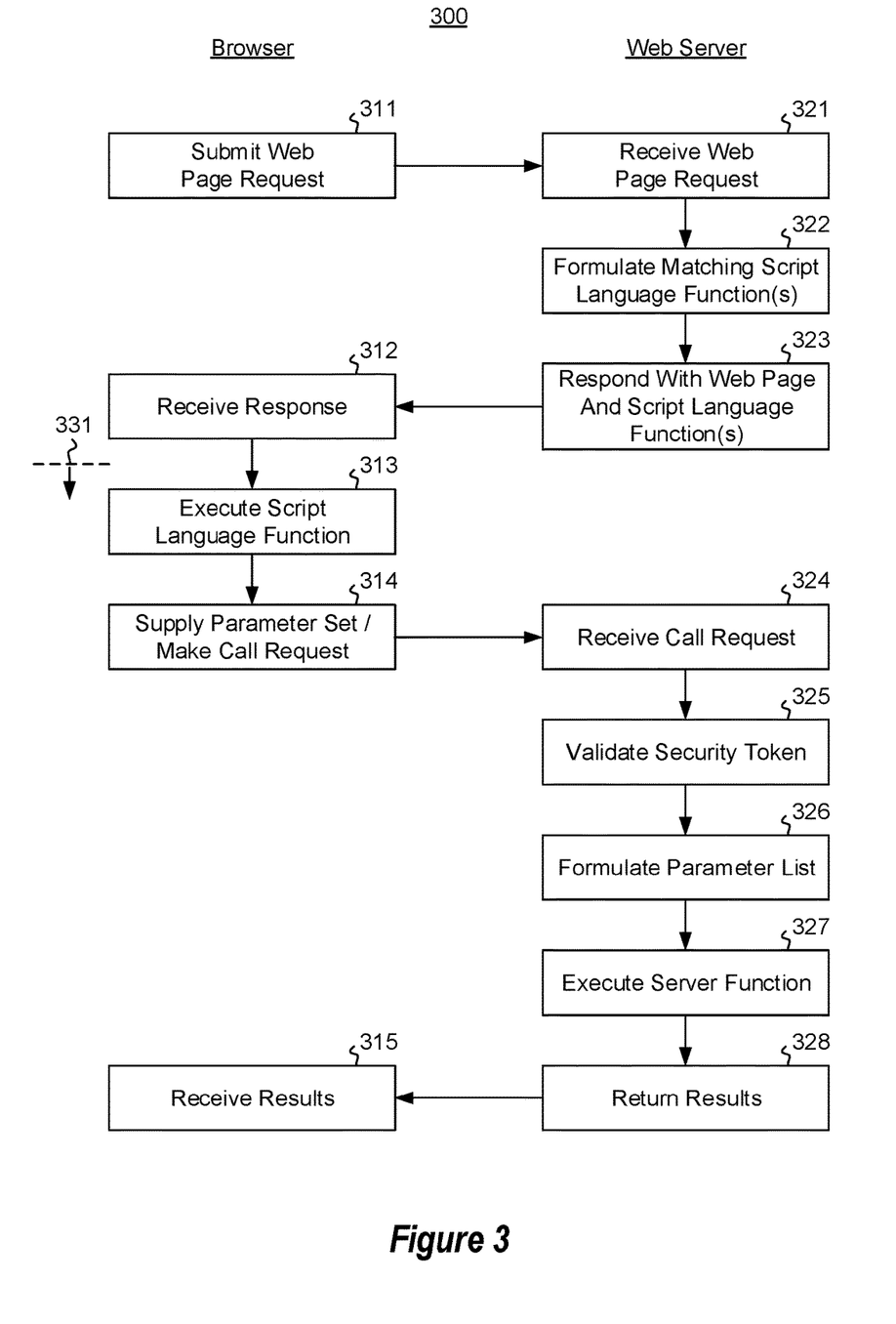
FIG. 3 illustrates a flowchart of a method for exposing a server function to a browser.

FIG. 3 illustrates a flowchart of a method 300 for exposing a server function to a browser. Some of the acts in the method 300 may be performed by the client computing system 220 of FIG. 2 and are represented in the left column of FIG. 2 under the heading "Browser". Other of the acts in the method 300 may be performed by the server computing system 210 of FIG. 2 and are represented in the right column of FIG. 2 under the heading "Web Server". As the method 300 may operate in the network environment 200 of FIG. 2, the method 300 will be described with frequent reference to FIG. 2.

Figure 4:
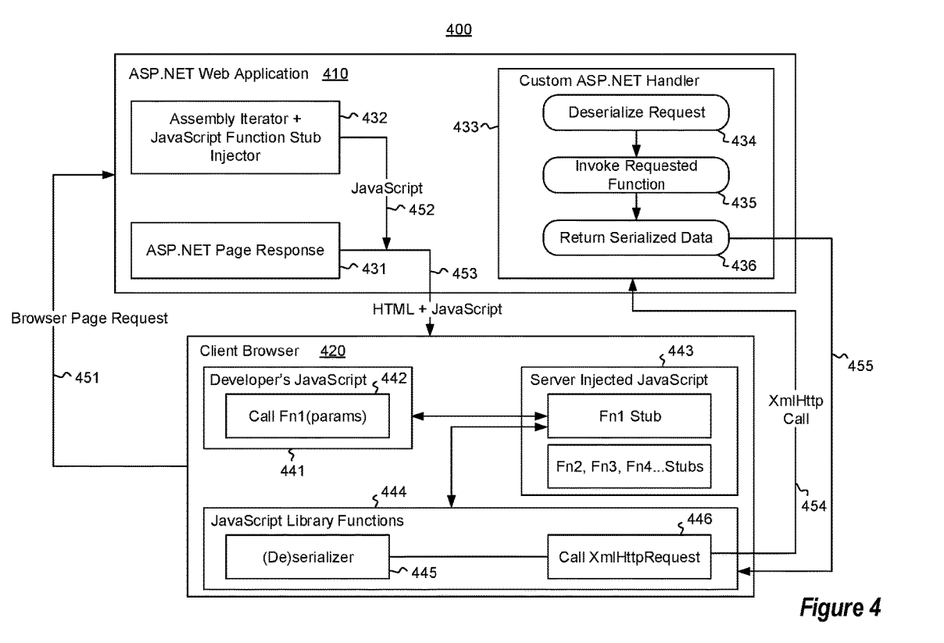
FIG. 4 illustrates a network environment in which a browser interacts with a web application, and represents a specific example of the network environment of FIG. 2.

FIG. 4 illustrates a network environment 400 that represents a more specific example of the network environment 200 of FIG. 2. Accordingly, the method 300 will also be described with frequent reference to the network environment 400 of FIG. 400. For instance, the client browser 421 of FIG. 4 may be an example of the browser 221 of FIG. 2, and the web application 411 of FIG. 4 may be an example of the web application 211 of FIG. 2. In the specific example of FIG. 4, the web application is an ASP.NET web application and the script language used is JAVASCRIPT.

The user 223 interacts with the user interface 222 of the client 220 to thereby request that the browser 221 navigate to a web page of a web application 211. In response thereto, the browser submits a request for a web page (act 311). For instance, referring to FIG. 2, the browser may submit a web page request for web page 212A of the web application 211 hosted by the web server 210. In FIG. 4, this request is represented by arrow 451 leading from the client browser 421 to the web application 411.

When the web server receives this web page request (act 321), the web server responds to the web page request. The response would include the requested web page, but would also include one or more script language functions in the response stream. Conventional web page responses often include script language code (such as JAVASCRIPT and VISUAL BASIC code) in the response stream to improve the dynamic performance and interactivity of the web page.

However, in accordance with the principles described herein, the web server actually exposes one, some or all of the server side functions by formulating a matching script language function for each server function that is to be exposed (act 322). From the viewpoint of a developer developing the web application, the task of exposing a server function may be as simple as marking the function as to be exposed to the browser. When called by the browser, the script language function operates to communicate a function call back to the web server so that the corresponding server function is called. Thus, the script language function operates as a function call channel that client code can call directly into, thereby effecting a server side function call.

As just mentioned, the web server actually exposes one, some or all of the server side functions by formulating a matching script language function for each server function that is to be exposed. This exposure is accomplished through the use of function exposing logic 214 in FIG. 2. This script language function is "matching" in the sense that it has a compatible (and perhaps even identical) name that may be used to properly identify the server function, and a matching parameter set in which each parameter of the script language function may be mapped to a corresponding parameter of the server function. The script language function has a body that, when executed, serializes at least the name and parameter set of the server side function resulting in a call request being dispatched to the web server. Optionally, to provide security, the web server may also generate a single click hack protection token (hereinafter "protection token") and formulate the script language token such that it also serializes the protection token as well. The protection token may be used in addition to other security tokens, such as a normal authentication token. In one embodiment, the protection token is a onetime use token that is dynamically generated on each page request in order to prevent susceptibility to a security attack sometimes referred to as a one-click or single-click attack in the industry.

Referring to FIG. 4, in which the web application is an ASP.NET web application and the script language function is a JAVASCRIPT function, an ASP.NET page response module 431 generates the web page response, which may include HyperText Markup Language (HTML) code that may be interpreted by the client browser 421 to thereby render the web page. The web page response may also include script code.

In addition, an assembly integrator and script function stub injector 432 generates the matching script language functions that are used to expose the server function(s). The inclusion of the matching script language function(s) in the response stream is symbolically represented in FIG. 4 by arrow 452, whereas the response stream itself is represented symbolically by arrow 453.

The manner in which this may be accomplished in the context of ASP.NET will now be described. All pages in the ASP.NET application inherit from a BasePage class. This class has a static constructor which uses Reflection to iterate through all assemblies in a certain scope and in the currently loaded AppDomain. For each assembly the constructor finds, the constructor iterates through all the classes and then all the public static functions of the classes, which are marked with the Attribute "AjaxFunction". For each such function the constructor finds, the constructor determines the names, order and types of all parameters the function expects. Now, having determined the full name of the function (including assembly, class and namespace) and the parameters, the constructor generates JavaScript code that defines a function matching the full name and parameters. The body of this JavaScript function contains code that calls a shared library JavaScript function responsible for serializing the values of the parameters, the function's full name, and a protection token used to protect against single-click attacks.

Referring back to FIG. 3, the web server responds to the web page request (act 323) with the web page code and the corresponding script language function. In the context of FIG. 4, the JavaScript function code is injected into the response stream as a JavaScript resource and marked to be cached by the browser. When this code is executed by the browser, it enables the developer to call it from any other JAVASCRIPT code on any page in the application. For instance, if an exposed server function is defined as "Contoso.MyApp.MyClass.MyFunction(string x, string y, int z)", the JAVASCRIPT function code that will be injected into the response stream may be similar to "Contoso.MyApp.MyClass.MyFunction=function(x, y, z)". Note the similar function name, and the matching parameter set in this example.

The browser 221 then receives the response (act 312) making the matching script language function(s) available to client code. In the context of FIG. 4, it is the JAVASCRIPT 452 that contains the code that the developer would call from the web page to invoke the server function. This JAVASCRIPT 425 is interpreted and rendered by the browser as 443.

In FIG. 3, the marker 331 represents that the remaining acts 313, 314, 324 through 328 and 315 may be repeated for any of the then available matching script functions. Furthermore, the marker 331 represents that the remaining acts may be performed at any time for any given server function for which the matching script language function is still available, not just immediately after the page response is received. Furthermore, the remaining acts may be performed multiple times for the same matching script language function if the server function is to be called multiple times. As an example, suppose there is a server function and matching script language function that updates stock prices. The remaining acts below marker 331 may be repeated with respect to that same matching script language function whenever the stock is to be updated. The remaining acts will be described with respect to one of the matching script functions that matches, for example, the server function 213A.

To make a function call to the server function, the browser executes the matching script language function (act 313). More specifically, perhaps script code associated with one of the web pages 212 calls the script language function. In the environment of FIG. 2, the browser 221 may execute the matching script language function corresponding to, for example, server function 213A.

Script code that is to invoke the server function 213A may then call the matching script language function (whenever the server function 213A is to be invoked) and thereby provide a parameter set to the executing script language function, thereby causing the name and parameter set of the server side function to be serialized in the form of a request to call the server side function (act 314).

In the context of FIG. 4, the client code 441 (which may, for example, be other Javascript code in any one of the web pages of the web application) calls one of the functions in the server injected JavaScript and provides the appropriate parameters. This call is represented by box 442. The task of the developer of the client code may be significantly simplified in the client code simply calls the matching Javascript function and supplies the relevant parameters. In response, the matching JavaScript function calls the serializer 445 to serialize the request, and an XmlHttpRequest 446 is generated to make an asynchronous AJAX call to the web server as represented by arrow 454.

Thus, the developer task is significantly simplified. From the standpoint of the web application, the developer identifies the server functions that are to be exposed—a simple task. From the standpoint of the client code that invokes the server function, the developer calls into the matching script language function and supplies the relevant parameters—again, a simple task.

The web server receives the request to call the server side function (act 324). In one embodiment, any script from any web page in the application may call any exposed server function. However, in the alternative embodiment in which there is some restriction on which pages can access the server function, scoping of the call is honored so that only web pages that are permitted to call a server function are allowed to call that server function. Again, however, in the embodiment in which all exposed server functions are callable from code in any web page in the web application, such scoping need not be performed.

If a protection token is included within the call request, the web server validates the protection token (act 325). The protection token is used to determine if the request from the client browser to execute the server function is coming from the user 223 and not a one-click attack constructed by a third party.

The web server then uses the call request to formulate the server using the request to formulate a parameter list (act 326). This may be accomplished since the parameter set of the matching script language function may be mapped in a predetermined way to the parameter set of the corresponding server function. The web server then executes the server side function identified in the call request (act 327), and the results are returned to the browser (act 328 and act 315). Once the browser receives the response from the server, the deserialization of the response happens. For instance, a response to the original call to the matching script language function is formulated by, 1) correlating the server function return to the original matching script language function call, and 2) mapping any returned parameters from the server function to parameters of the original matching script language function call to thereby populate the return of the original matching script language function call.

Referring to FIG. 4, the call request is received by an ASP.NET HttpHandler 433, which understands the format of the incoming request. The hander 433 deserializes the request (represented by 434), deciphers the protection token and validates it, and optionally authenticates the request (based on if the function requires authentication). The handler 433 also builds a parameter list of the correct types as expected by the server function. The handler 433 then invokes the server function with the parameter list as represented by 435. When the server function returns, the HttpHandler serializes the return data (represented by 436) and returns it in the response stream (represented by arrow 455).

Referring still to FIG. 4, when the response is received by the JavaScript library function 446 that had issued the XmlHttpRequest call, the library function 445 deserializes the response, and constructs a JSON object using the same property names and values that the HttpHandler serialized for the data (which is the same as the ones defined for the type of the return object). The library function 445 then passes this JSON object to the developer's JavaScript code that called the injected (generated) JavaScript function. The JSON object also optionally contains a property specifying an error code for any errors that occurred on the server, or during processing of the request or response in the JavaScript code.

Accordingly, the principles described herein allow server functions to be exposed to browsers across multiple web pages in a web application, and with potentially added security offered by the use of a protection token. The developer tasks in exposing the server function are significantly simplified both from the viewpoint of the web application, as well as the viewpoint of the code that invokes the server function.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer storage media having thereon computer-executable instructions that are structured such that, when executed by one or more processors of a web server, cause the web server to perform a method for the web server to expose a function to a browser, the method comprising:
   receiving a request for a web page that is one of a plurality of web pages in a web application;
   in response to the request for the web page, for at least one server side function of the web application, determining a name, order, and type for each parameter the server side function expects, generating a corresponding script language function that defines a matching name and parameter set of the server side function, the script language function having a body that, when executed, serializes at least the name and parameter set of the server side function and communicates to the server a function call corresponding to the server side function, the script language function being callable from multiple web pages of the web application such that the server side function can be called from each of multiple different contexts within the web application; and
   responding to the web page request with the requested web page and the corresponding script language function.

2. The computer program product in accordance with claim 1, wherein the computer-executable instructions are further structured such that, when executed by the one or more processors, the web server is further caused to perform the following for the at least one server side function:
   receiving a request to call the server side function, the request to call being generated as a result of a browser executing the body of the corresponding script language function, the request to call including the name and parameter set of the server side function;
   using the request to formulate a parameter list; and
   executing the server side function using the parameter list.

3. The computer program product in accordance with claim 2, wherein the request to call is honored across multiple web pages of the plurality of web pages in the web application.

4. The computer program product in accordance with claim 2, wherein the request to call is honored across all of the plurality of web pages in the web application.

5. The computer program product in accordance with claim 2, wherein the body of the corresponding script language function also serializes a protection token of the server side function, wherein the computer-executable instructions are further structured such that, when executed by the one or more processors, the web server is further caused to perform the following:
   validating the protection token.

6. The computer program product in accordance with claim 2, wherein the computer-executable instructions are further structured such that, when executed by the one or more processors, the web server is further caused to perform the following:
   returning results of the execution of the parameter list.

7. The method in accordance with claim 1, wherein the script language function is a first script language function, and the server side function is a first server side function, wherein the computer-executable instructions are further structured such that, when executed by the one or more processors, the web server is further caused to perform the following in response to the request for the web page:
   formulating a corresponding second script language function that defines a matching name and parameter set of a second server side function, the second script language function having a body that, when executed, serializes at least the name and parameter set of the second server side function; and
   responding to the web page request also with the second script language function.

8. The computer program product in accordance with claim 7, wherein the computer-executable instructions are further structured such that, when executed by the one or more processors, the web server is further caused to perform the following in response to receiving a request to call the second server side function, the request to call the second server side function being generated as a result of the browser executing the body of the second script language function, the request to call the second server side function including the name and parameter set of the second server side function:
  using the request to call the second server side function to formulate a parameter list for the second server side function; and
  executing the second server side function using the parameter list for the second server side function.

9. The computer program product in accordance with claim 1, wherein the body includes a function call to a library function that, when executed, serializes at least the name and parameter set of the server side function.

10. The computer program product in accordance with claim 1, wherein the body of the corresponding script language function also serializes at protection token of the server side function.

11. A method for a browser to execute a server function, the method comprising:
  submitting a request for a web page that is one of a plurality of web pages in a web application; and
  receiving a response to the request, the response including the requested web page and a script language function for execution in the browser,
    the script language function received from the server defining a matching name and full parameter set of the server side function such that each parameter of the script language function maps to a corresponding parameter of the server side function,
    the script language function having a body that, when executed, serializes at least the name and parameter set of the server side function and communicates to the server a function call corresponding to the server side function, and
    the script language function being callable from the plurality of web pages of the web application such that the server side function can be called from each of multiple different contexts within the web application.

12. The method in accordance with claim 11, further comprising:
  executing the script language function.

13. The method in accordance with claim 12, further comprising:
  providing a parameter set to the executing script language function, thereby causing the name and parameter set of the server side function to be serialized in the form of a request to call the server side function.

14. The method in accordance with claim 13, further comprising:
  receiving results of the execution of the server side function that was executed in response to the request to call the server side function.

15. The method in accordance with claim 11, wherein the request to call is honored within part of the web application.

16. The method in accordance with claim 11, wherein the request to call is honored within all of the web application.

17. The method in accordance with claim 11, wherein the body of the corresponding script language function also serializes a protection token of the server side function.

18. The method in accordance with claim 11, wherein the body includes a function call to a library function that, when executed, serializes at least the name and parameter set of the server side function.

19. The method in accordance with claim 11, wherein the body of the corresponding script language function also serializes at protection token of the server side function.

\* \* \* \* \*